(12) United States Patent
Vass

(10) Patent No.: US 7,251,627 B1
(45) Date of Patent: Jul. 31, 2007

(54) METHOD OF IDENTIFYING A UNIVERSE OF STOCKS FOR INCLUSION INTO AN INVESTMENT PORTFOLIO

(76) Inventor: Thomas E. Vass, 6001 Waters Way Dr., Raleigh, NC (US) 27606

( * ) Notice: Subject to any disclaimer, the term of this patent is extended or adjusted under 35 U.S.C. 154(b) by 950 days.

(21) Appl. No.: 09/406,394

(22) Filed: Sep. 27, 1999

(51) Int. Cl.
*G06Q 40/00* (2006.01)

(52) U.S. Cl. .................................................. 705/36 R

(58) Field of Classification Search ............... 705/36, 705/37, 35, 38, 39, 40, 36 R
See application file for complete search history.

(56) References Cited

U.S. PATENT DOCUMENTS 6,064,985 A * 5/2000 Anderson ..................... 705/36
6,275,814 B1 * 8/2001 Giansante et al. ............ 705/36

OTHER PUBLICATIONS

Charles T. Horngren & Gary L. Sundem, "Introduction to Financial Accounting", 3rd Ed, Prentice Hall, Englewood Cliffs, NJ, 1988.*

Financial Analysis Journal, The Early History of Portfolio Theory: 1600–1960, Harry M. Markowitz, Jul./Aug. 1999, 12 pages.

* cited by examiner

*Primary Examiner*—Andrew J. Fischer
(74) *Attorney, Agent, or Firm*—Coats & Bennett, P.L.L.C.

(57) ABSTRACT

A method of identifying a universe of stocks for inclusion into an investment portfolio that includes scanning a computerized stock database and selecting stocks into the universe according to a predetermined set of factors and criteria. Primarily, the scanning of the stock database aims at first identifying only stocks from certain industry sectors. Once these industry sector stocks have been identified, they are further examined to determine if they meet certain established criteria. For example, once the industry sector stocks have been selected, through a computerized scanning process, each of the stocks are examined to determine if they meet selected criteria. Some of the criteria established in the screening process includes determining if the stocks have consistently paid a dividend over a selected period of time and whether the stocks meet a certain debt to equity ratio over a predetermined period of time. Further the scanning process examines whether the stock has stable or rising sales, profits and profits per share for a selected period on a yearly quarter basis. Further the stocks in the database and those meeting preliminary criteria are further examined for credit rating. Once the universe of stocks has been established, then target buy and sell prices are established based on past price history. Thereafter, the stocks that make it into the universe are continuously monitored and as the price of the stocks of the universe reach the target buy and sell prices, they are bought and sold.

12 Claims, 4 Drawing Sheets

METHOD OF IDENTIFYING A UNIVERSE OF STOCKS FOR INCLUSION INTO AN INVESTMENT PORTFOLIO

FIELD OF THE INVENTION

The present invention relates to a computerized method and system for scanning a stock database and based on predetermined criteria, identifying a universe of stocks for possible inclusion into a stock portfolio. Further, the present invention entails continuously monitoring and updating the universe of stocks and continuously monitoring the stock portfolio and executing buy and sell orders based on established target purchase and sale prices.

BACKGROUND OF THE INVENTION

There are, of course, many theories for managing a stock portfolio. For example, some stock portfolio managers may rely heavily on technical analysis while others may rely on certain conventional financial ratios such as price to earnings, debt to equity and percentage increase in earnings. However, these approaches to stock portfolio management ignore many fundamental economic relationships that take place over time in the marketplace and which substantially influence the market value of common stocks. In short, these approaches ignore the link between internal supply and demand forces at work in the stock market and the broader macro economics forces that dictates the price trends of common stocks. This invention overcomes some of these differences by applying macro general equilibrium economic theory to the selection of specific stocks for inclusion in an investment portfolio.

SUMMARY OF THE INVENTION

The present invention entails a method for identifying a universe of common stocks that meet certain selected criteria and then selecting stocks from that universe for inclusion into a stock portfolio based on additional criteria. In selecting stocks into the universe, the present invention entails scanning a stock database and identifying stocks that fall into predetermined industry sectors. Those stocks that fall within the selected industry sectors are selected for the universe and all other stocks are excluded. Further, the stock scanning process for identifying stocks for inclusion into the universe examines the available industry sector stocks to determine if they meet additional criteria. The additional criteria for inclusion into the universe includes one or more of the following criteria. First, whether a particular stock has consistently paid a dividend over a selected period of time is one criteria in determining if the stock is included in the universe. Secondly, the screening further examines the debt to equity ratio of the stocks being screened. In one application of the present invention, the screening process looks for stocks that have a debt to equity ratio of twenty percent or less. A third factor relates to sales, profits and profits per share. The screening process will identify stocks that have stable or rising sales, profits and profits per share based on past quarter reports on a yearly basis. In addition, the further screening process looks at the credit rating of the individual stocks and will apply a selected threshold for inclusion of stocks within the universe. Certain credit standards can be established, but in one application of the present invention, the screening of the stock database looks for stocks having a Standard & Poor's credit rating of A, B or non-rated. Some applications of the present invention will apply all of the above criteria, while other applications will weigh the various criteria and apply only selected criteria. In any event, once the screening process has been completed, a universe of stocks will be identified and from this universe of stocks, selected stocks will be periodically chosen for inclusion into a stock portfolio. It should also be pointed out that the identified universe is dynamic and the stocks therein would continue to change as new stocks from the database would periodically be added and stock within the universe would be periodically excluded based on predetermined criteria.

The present invention further entails buying and selling stocks identified by the universe. Basically target purchase and sale prices are established based on a past price history of the respective stocks. Through a computerized monitoring system, the prices of the respective stocks of the universe are continuously monitored and selected stocks identified within the universe are purchased when their market price reaches or meets the target purchase price and by the same token once the stock is purchased, its price is continuously monitored and the stock is sold once it reaches its target sale price.

Once the universe of stocks has been established and once certain stocks of the universe have been purchased to form a stock portfolio, both the universe of stocks and the active stock portfolio are continued to be monitored on a daily basis. Specifically, stocks of the universe and the stocks within the active portfolio are monitored via a computer for various criteria and parameters. In one application of the present invention, the occurrence of a net loss for any stock in the universe or in the active portfolio will result in the stock being excluded from the universe and sold if it happens to be in the active portfolio. Additionally, the daily monitoring continues to examine for persistent negative trends in sales revenue. Further, the ongoing profits of the stocks, in both the universe of stocks and the active portfolio, are continuously monitored for declines in profits over a selected period of time. In the event that selected threshold limits are reached, then the stocks are excluded from the active portfolio as well as the universe of stocks. Further, various traditional or fundamental financial ratios are continuously monitored for the stocks. These ratios include: net income to sales, net cash flow from operations to shareholder's equity, net sales to inventory, and net income to equity ratio. These ratios for each of the stocks in the universe are continuously compared to industry or SIC averages and by particularly weighing the ratios and measuring the differences between the respective ratios for a stock and the industry averages the system is able to continuously evaluate the financial health of the underlying company. Thus, the strength of the stock based on these ratios and the industry average for these ratios can be quantified and that quantification can be utilized in determining what stocks to maintain in the universe and what stock to exclude from the universe. The trends in these ratios for a specific company compared to the SIC averages indicate information about how well management in a company is responding to competitive forces.

Other objects and advantages of the present invention will become apparent and obvious from a study of the following description and the accompanying drawings which are merely illustrative of such invention.

DETAILED DESCRIPTION OF THE INVENTION

The present invention entails a computerized method of selecting a universe of stocks from which a stock portfolio may be derived. In selecting a universe of stocks, criteria and parameters are imposed that are calculated and reasoned to link internal supply and demand principles that influence the stock market with broader macro economic theories that determine the market value of common stocks. As will be outlined below, once the universe of stocks has been defined, each stock of the universe is continuously reexamined to assure that it, on a continuing basis, meets the criteria and parameter set for the universe. In cases where an existing stock of the universe fails to measure up to the established criteria and standards for the universe, then that stock is excluded from the universe.

Once the universe of stocks has been defined, then the present invention entails setting target purchase and sell prices for each stock of the universe. The target prices are based on the price history of the stocks for a selected time period. The target sales price is in turn based on the target purchase price.

Figure 1:
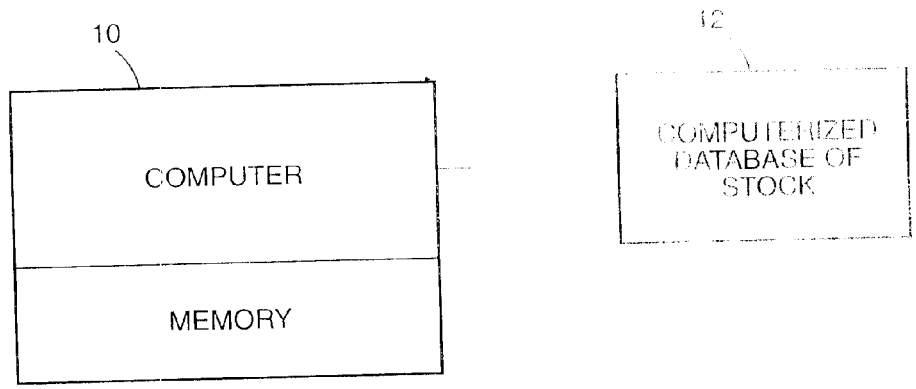
FIG. 1 is a schematic illustration of the computerized system of the present invention for identifying a universe of stocks and monitoring a stock portfolio based on the universe.
Figure 2:
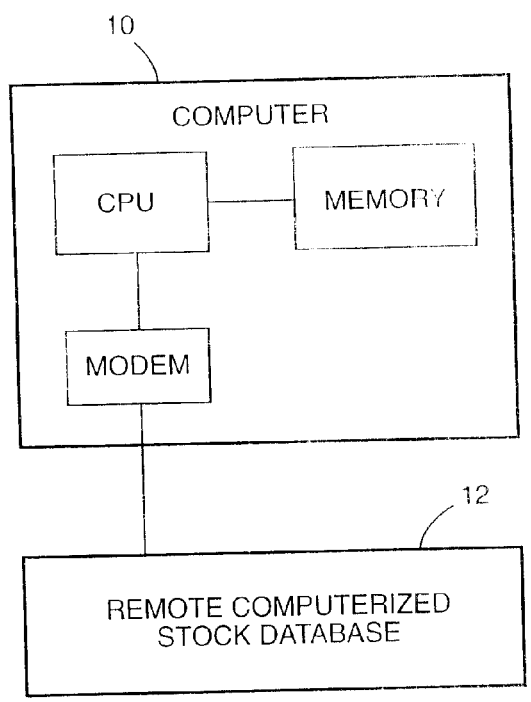
FIG. 2 is a schematic illustration of an alternate design for the computerized system shown in FIG. 1.

As noted above, the present invention entails a computerized method. Basically, as illustrated in FIG. 1, a computer 10 is connected to a stock database 12. The stock database can form a part of an area network or can be connected from a remote site such as an Internet site through a communications modem to the computer 10. In any event, the computer 10 is operative to receive data and information relating to a wide number of stocks and such information is received and stored on a temporary basis in the memory of the computer 10. Through appropriate software, the data and information pertaining to stocks can be scanned, reviewed and constantly monitored. Further, the software is designed to actually identify a selected universe of stocks based on certain criteria and parameters, and to calculate target purchase and sell prices for the stocks as well as to issue alerts to execute buy and sell orders, again based on established protocol.

The present invention entails generating a universe of stocks that meet certain criteria and financial parameters, and from that universe of stocks purchasing selected stocks to form an active portfolio. On an ongoing basis, the universe of stocks is reviewed and from time to time stocks are excluded from the universe and new stocks are added. At the same time, stocks held within the active portfolio are reviewed on a daily basis and from time to time stocks in the active portfolio are sold while other stocks in the stock universe will be purchased for the active portfolio.

Figure 3:
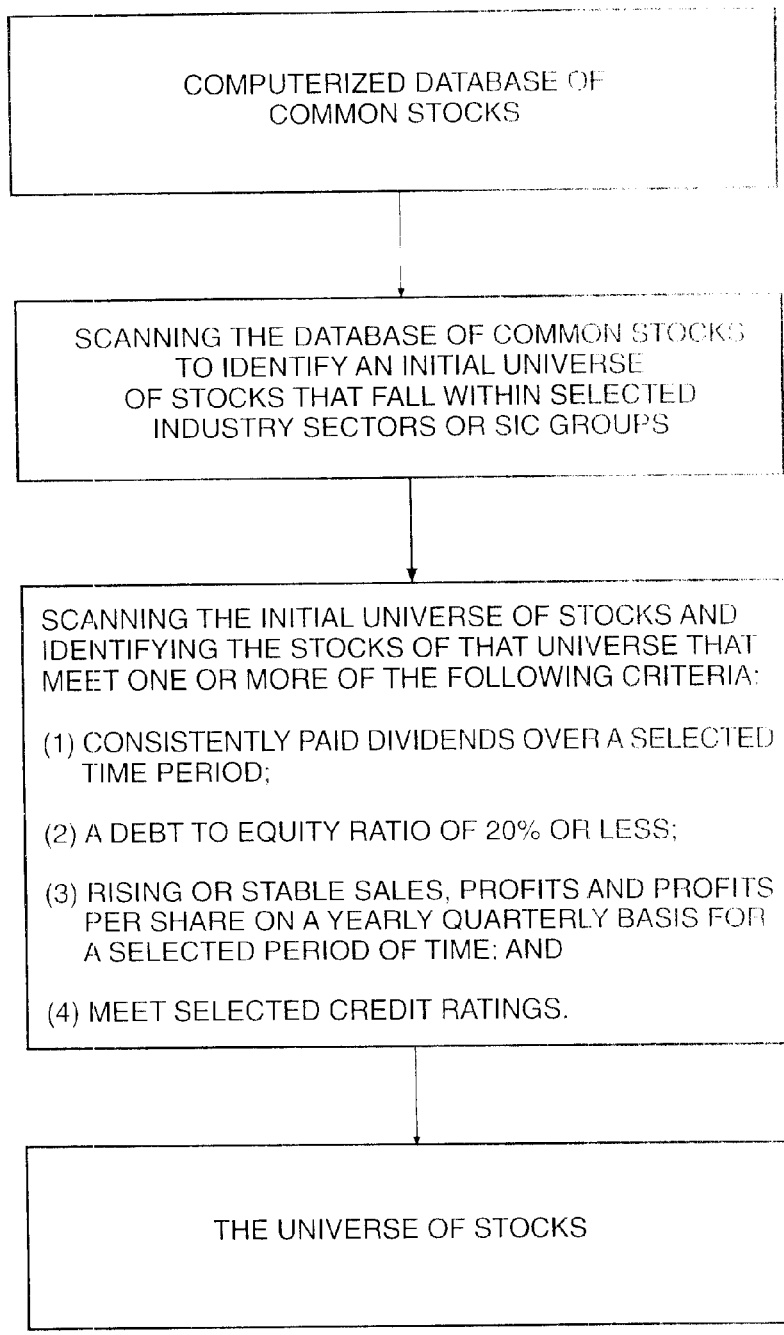
FIG. 3 is a flow chart illustrating basic decisional steps made by the computerized system of the present invention in identifying a universe of stocks.
Figure 4:
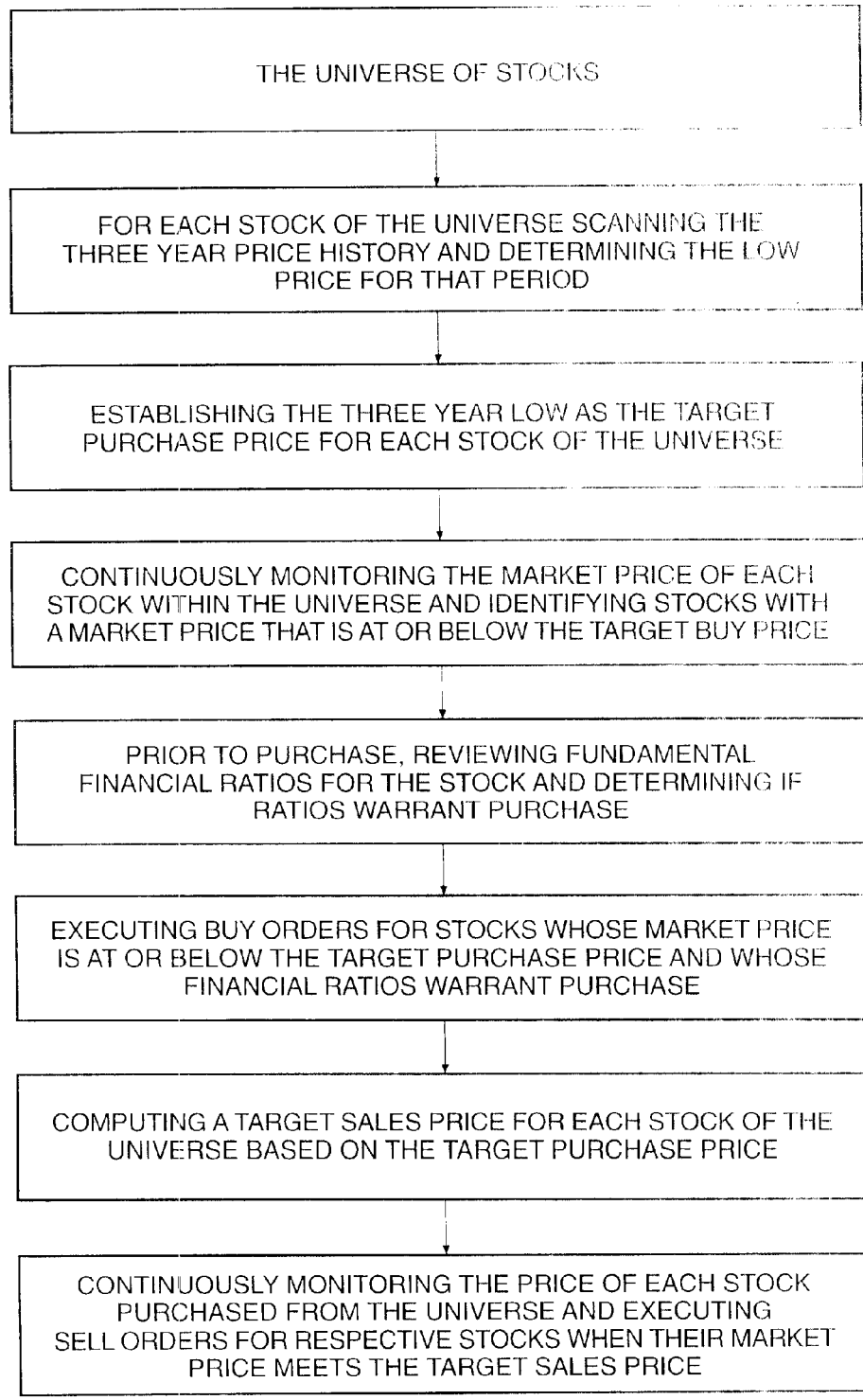
FIG. 4 is a flow chart illustrating basic decisional steps made by the computerized system of the present invention in establishing target purchase and sales prices for the stocks in the universe.

Turning to FIG. 3, there is shown therein a flow chart that illustrates the steps of defining and establishing a universe of stocks according to the present invention. The process or method begins with a computerized database of common stocks. The computerized database of common stock is communicatively connected to the computer 10 and as pointed out above the computerized database may be a remote database such as an internet database or may be a private database or database that forms a part of an area network. In any event, in the context of the present invention, the computerized database would include stocks from the New York Stock Exchange, American Stock Exchange and NASDAQ. Each of the stocks in the computerized database would have certain fields of data including industry sector codes which are sometimes referred to as SIC numbers. In addition there would be fields of data relating to past historical earnings as well as the past historical values for the market price of the stocks. As will be discussed in more detail later, each stock in the computerized database would have associated therewith certain data fields for financial ratios as well as a data field for daily news items pertaining to the stock.

In establishing the universe of stocks according to the present invention, there are a number of basic principles applied. First, the process revolves around selecting only stocks from a selected industry sector groups. In the case of the present invention, the universe of stocks is selected from the industry sector groups denoted by SIC 26-38, 50, 72 and 73. The logic of relying on industrial sectors is due both to their role in diffusing technological innovations and to their high inter-industry linkages. In a preferred application of the present invention, all of the stocks that fall within these SIC groups are considered candidates for the universe of stocks. However, it should be noted, that the present invention can be applied in ways where only certain stocks within these SIC groups would be considered as candidates for the universe. In any event the computerized database includes a SIC number field and the present invention entails the computer 10 scanning the SIC fields of the stocks that comprise the computerized database and identifying for possible inclusion into the universe stocks having certain SIC numbers.

Even though a stock may lie within the SIC number group specified, that does not mean that the stock will ultimately end up in the final universe of stocks. Those stocks falling within the initial universe of stocks because of their SIC numbers must be further analyzed. Specifically, the process of the present invention and the computer software employed looks at a number of relevant criteria and financial parameters. This further examination looks to see if each stock of the initial universe has consistently paid dividends over a selected time period, such as for example three years. Next in scanning the stocks of the initial universe, attention is paid to the debt to equity ratio of each stock. The program sets a threshold for the debt to equity ratio for all stocks selected into the universe. In one particular application of the present invention, the threshold is 20% or less. Next, the program looks to determine if a stock has rising or stable sales, profits and profits per share on a yearly quarter basis for a selected time period. Again if any stock selected into the initial universe is found to have declining sales, profits or profits per share on a yearly quarter basis, than that stock is not selected into the final universe. Finally, the program examines each stock to determine if it meets a selected credit rating schedule. There are a number of services that provide credit ratings for stocks. In one application of the present invention, the program for identifying the ultimate universe examines Standard & Poor's credit rating for each respective stock. In order to be selected into the universe, the stock must have a Standard & Poor's credit rating of A, B or non-rated. If the credit rating does not meet this threshold requirement, in this particular application, then the stock is not selected into the final universe of stocks.

As outlined in FIG. 3 and as discussed above, the method or program is defined as first identifying stocks that fall within a certain sector group and then evaluating those stocks to see if they meet additional criteria. However, it should be understood, that the software employed could conduct the necessary screenings in a single step with the industry sectors being considered as simply one criteria of a group of criteria and parameters that must be met in order to qualify for inclusion into the universe of stocks. Also, as pointed out below, even after stocks are selected for inclusion into the universe of stocks, they are analyzed and evaluated on a daily on going basis and unless they continue to meet certain criteria and financial parameters they are not continued to be included within the defined universe. By the same token, the analysis and screening for the universe is continuous and an on going process and therefore new stocks will from time to time meet the criteria and standards required for inclusion and will be selected into the universe.

After the universe of stocks has been selected, the program turns to purchasing stocks of the universe to form what is referred to as the active portfolio. The present invention incorporates a computerized program for purchasing stocks from the universe and for subsequently selling any purchased stock. Basically, the present program entails reviewing the past price of each stock in the universe for a selected time, for example three years. The three-year period logically relates to a product life cycle for the selected SIC codes. At any moment, companies are assumed to be at some point in this three-year product life cycle. The computer and the software employed analyzes the price history of each respective stock during this time period and selects the low for that stock for the time period in question. The low for the time period selected is related to where the company is in the product life-cycle at that low price becomes the target purchase price. Therefore, once a stock makes it into the universe, the computer program automatically analyzes the price history for a certain period of time and determines the low for that period of time and sets that low price as the future target purchase price. From that point on, the computer program continues to monitor the daily price of each stock in the universe. In the event that a stock of the universe reaches the target purchase price then the computer program is programmed to provide continuous alerts that the stock meets the buy criteria.

In the alternative, the program can be altered to employ a confirming analysis before a final decision is made to purchase the stock, even after the stock has reached the target purchase price. Here the program for any such stock examines certain financial ratios of the stock along with corresponding average industry sector (SIC) ratios. If the ratios for that stock are declining or if as a whole they fall below the corresponding average ratios for the industry sector of that stock, then the computer is programmed to weigh these factors and in some cases to decline to purchase a stock even though it is in the universe and even though it is at its target purchase price. On the other hand, if these financial ratios are rising or stable or if they exceed corresponding industry averages, then a final decision is made to purchase the stock in question. Although a number of financial ratios can be used to confirm the decision to purchase, the present invention contemplates that four particular financial ratios will be used in this case: net income to sales, net cash flow from operations to shareholder's equity, net sales to inventory ratio, and net income to equity.

Once a stock from the universe has been purchased, then the computer program automatically monitors an internal target sell price for the stock. In the application of the present invention, a simple multiplier is used. Based on past history, the present invention contemplates that a suitable and prudent sales price would be 140% of the target purchase price based upon traditional analysis of standard deviations around the mean stock price. Accordingly, the program of the present invention continues to monitor the market value field of the database for each purchased stock and as the market price of that stock reaches the target sales price, the same set of financial ratios is examined to determine the accuracy of the sell price. If the ratios for the specific company are stable or rising, the decision to sell at the initial target sell price will be deferred.

In order to protect against substantial losses, the present invention entails setting a limit to sell price for each stock of the active portfolio. Thus, in the event that the price of any security falls to the limit sale price, the program of the present invention will issue an alert to execute a sell order. In the case of a particular application of the present invention, the limit to sell price is set at 20% below the target purchase price. In some cases, the threshold limit sale price is crossed in so short a time, that the application cannot react fast enough to sell out the position of the stock at precisely the limit sale price. In this case, the stock may be continued to be held in the active portfolio. Generally, but not always, the price will recover to the initial target purchase price over some extended period of time. If the stock price has crossed the limit sale price but has not recovered after a number of quarters, the program will reestablish a sale price within the range of most recent prices and take the capital loss at the lower sale price.

After the universe of stocks has been established and after stocks from the universe are purchased for the active portfolio, the present invention entails an on going monitoring program for both the universe of stocks and the active portfolio. As discussed above, on an on going basis stocks are excluded from the universe and the active portfolio while new stocks are added to the universe and the active portfolio.

Figure 5:
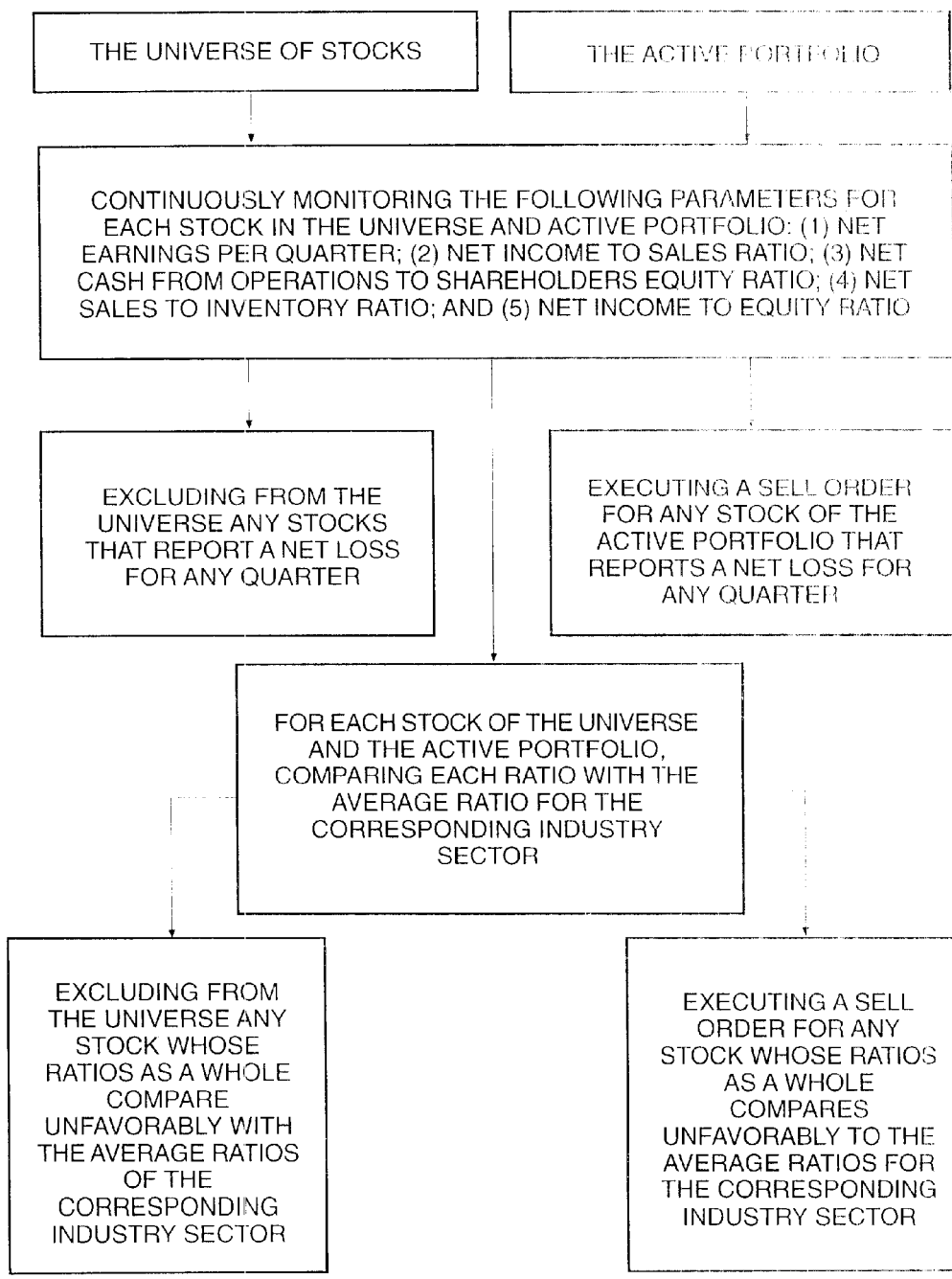
FIG. 5 is a flow chart illustrating basic decisional steps made by the computerized system of the present invention in continuously monitoring the stocks of the universe and the active portfolio.

The application of this on going monitoring is illustrated in the flow chart of FIG. 5. First, for all of the stocks involved, the computer database includes a data field for the quarterly earnings of all of the stocks therein. This data field is continuously monitored on a daily basis by the computer. If at any time, any stock in the universe or the active portfolio experiences a net loss for any quarter, then that stock is excluded from the universe or the active portfolio. In terms of a net loss, of special interest are losses which result from large sudden write-offs of inventory, or dramatic shifts in business strategies that cause write-offs to be applied against net revenue in the immediate quarter, or dramatic changes in accounting practices that accompany changes in business strategy. The logic of this special attention to sudden write-offs or shifts in strategy is due to the fact that these factors are identified early through analysis of the four key financial ratios. The trend in the ratios generally provides an early warning system about the specific company that is confirmed eventually by public disclosure of the write-offs or shifts in strategy.

Another parameter that is continuously monitored is the debt to equity ratio of each stock of the universe and the active portfolio. A threshold limit is programmed for the debt to equity ratio. In one preferred application of the present invention, this threshold is 20%. That is, if the debt to equity ratio exceeds 20% for any given stock, then that stock is excluded from the universe or sold from the active portfolio.

Further, the present invention continues to monitor sales revenues and profits for each of the stocks in the universe and active portfolio. If the system determines that there is a persistent negative trend in sales revenues, or a decline in profits over three successive yearly same quarters, then depending on the magnitude of those trends, the particular stock of interest is excluded from the universe or the active portfolio.

Finally, while monitoring sales and profits, the system of the present invention continues to monitor a set of four fundamental ratios, discussed above, that relate to the financial health of the underlying company and to management's integrity to disclose important public information. Here the computerized database includes a data field for each of these ratios for each stock in the database. The four ratios that are continuously monitored are: net income to sales, net cash flow from operations to shareholder's equity, net sales to inventory, and net income to equity. These financial ratios are important because net income to sales indicates how the company is controlling cost in order to achieve higher profits. Net cash flow from operations to shareholder's equity usually describes the efficiency of management in utilizing the assets of the company. Net sales to inventory reflects the degree of obsolesce that may built up in the company's production cycle. Net income to equity is the traditional measure of the profitability of the company related to the owner's capital.

These four fundamental financial ratios are compared with the corresponding average ratios for the particular industry sector or SIC code of the stock in question. The program is designed to provide an alert in the event that these four ratios, when viewed as a whole, tend to compare unfavorably with the corresponding average ratios of the particular industry sector. If the fundamental ratios of a stock do indeed compare unfavorably with the SIC industry averages, then depending on the magnitude of the disparity, a decision is made to exclude this stock from the universe or from the active portfolio by executing a sale order. The analysis of trends in these ratios provide an early indication of financial distress.

The present invention also entails a portfolio management strategy that is designed to diversify assets. Thus, individual stocks in the active stock portfolio just described would only comprise a certain portion of the total assets being managed. As a starting point, the system of the present invention would consider a balanced total portfolio which would be comprised of one-third U.S. Government and foreign government bonds, one-third A-rated U.S. Corporate Bonds, and corporate preferred stock, and one-third common stocks. Depending on the desires and the goals of the portfolio owner, the present invention entails that the stock portfolio component of the total asset portfolio will be restricted to a certain percentage of the total assets. That is based upon the goals of the individual client, the stock portfolio component of the total asset portfolio is either increased or decreased from the initial assumption that stocks would comprise one-third of the total assets.

The present invention may, of course, be carried out in other specific ways than those herein set forth without departing from the spirit and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method of buying and selling stocks for an investment portfolio comprising:
   a) identifying a universe of stocks from a stock database that meets the following criteria:
      i) consistently pay dividends;
      ii) have a debt to equity ratio of 20% or less;
      iii) fall within a predetermined industry sector group;
      iv) within a prior three year period have rising or stable sales, profits and profits per share on a yearly quarter basis; and
      v) meet a predetermined credit rating;
   b) for each stock of the universe, establishing target buy and sell prices based on an approximate three year price history for the stock, the established target buy price being approximately the three year low for the stock and the target sale price being approximately 40% greater than the target buy price; and
   c) monitoring each of the stocks of the universe on a daily basis and buying selected stocks when they reach the target buy price and selling selected stocks held when they reach the target sale price.

2. The method of claim 1 wherein the industry sector group includes SIC 26-38, 50, 72 and 73.

3. The method of claim 1 including selling stocks that have been purchased when they fall to a value of 20% of the established target purchase price.

4. The method of claim 1 including identifying any stock in the universe that experiences a net loss for any quarter and excluding that stock from the universe.

5. The method of claim 1 including monitoring the stocks purchased from the universe and identifying any purchased stock that experiences a net loss for any quarter and selling that stock in response to the net loss.

6. The method of claim 1 wherein the method employs Standard & Poor's credit rating and only stocks having a Standard & Poor's credit rating of A, B, or non-rated are selected into the universe.

7. The method of claim 1 further including, after the stocks have been selected into the universe, monitoring the stocks of the universe and excluding from the universe any stocks that would not subsequently qualify for inclusion into the universe based on the criteria set forth in claim 1.

8. The method of claim 1 including continuously monitoring each stock of the universe and excluding any stock from the universe that exhibits a persistent negative trend in sales revenues or a decline in profits over three successive yearly same quarters.

9. The method of claim 1 including continuously monitoring each stock of the universe for its net income to sales ratio, net cash flow from operations to stockholder's equity ratio, net sales to inventory ratio, and net income to equity ratio.

10. The method of claim 9 wherein the monitoring of the universe of stocks compares the ratios of each stock with corresponding average ratios for the industry sector of the stock.

11. The method of claim 10 wherein the ratios for a particular stock that are trending above the average ratios for that stock sector are deemed positive while ratios that are flat for a stock over a period of time compared to the average ratio for the stock sector of that stock are deemed neutral, and wherein ratios for a particular stock that are in decline compared to the average ratios for the industry sector are deemed negative.

12. The method of claim 1 including monitoring a series of traditional financial ratios for each stock purchased wherein the series of traditional financial ratios are taken from the set of: net income to sales ratio, net cash flow from operations to shareholders equity ratio, net sales to inventory ratio, and net income to equity ratio; and comparing the series of traditional financial ratios to corresponding average SIC ratios.

* * * * *